US012807318B1

(12) United States Patent
Bryant et al.

(10) Patent No.: US 12,807,318 B1
(45) Date of Patent: Nov. 24, 2026

(54) SYSTEM AND METHOD FOR SAFEGUARDING VEHICLE POWER DISTRIBUTION FROM ERRONEOUS COMMANDS

(71) Applicant: Textron eAviation Inc., Wichita, KS (US)

(72) Inventors: Logan Daniel Bryant, Wichita, KS (US); Kyle Austin Fanning, Wichita, KS (US); Kaden William Fitzpatrick, Wichita, KS (US)

(73) Assignee: Textron eAviation Inc., Wichita, KS (US)

( * ) Notice: Subject to any disclaimer, the term of this patent is extended or adjusted under 35 U.S.C. 154(b) by 18 days.

(21) Appl. No.: 19/229,200

(22) Filed: Jun. 5, 2025

(51) Int. Cl.
*B64D 31/09* (2024.01)
*B64D 31/14* (2006.01)
*H02J 4/00* (2006.01)
*H02J 105/30* (2026.01)

(52) U.S. Cl.
CPC ............. *B64D 31/09* (2024.01); *B64D 31/14* (2013.01); *H02J 4/00* (2013.01); *B64D 2221/00* (2013.01); *H02J 2105/32* (2026.01)

(58) Field of Classification Search
CPC .... B64D 31/09; B64D 31/14; B64D 2221/00; H02J 4/00; H02J 2105/32
USPC ....................................... 701/43, 48, 3, 9, 14
See application file for complete search history.

(56) References Cited

U.S. PATENT DOCUMENTS

| | | | | | |
|---|---|---|---|---|---|
| 11,401,041 | B2 * | 8/2022 | Baig | .................... | B64D 27/357 |
| 11,634,234 | B2 * | 4/2023 | Bruce | .................... | B64D 27/10 307/9.1 |
| 11,724,796 | B2 * | 8/2023 | Culpin | .................... | B64C 13/50 307/18 |
| 2022/0332429 | A1 * | 10/2022 | Calder | .................... | B60L 50/10 |
| 2026/0008557 | A1 * | 1/2026 | Hagerott | ................ | B64D 31/16 |

FOREIGN PATENT DOCUMENTS

| | | | |
|---|---|---|---|
| AU | 2023306232 | A1 | 1/2025 |
| EP | 3998687 | A1 | 5/2022 |

OTHER PUBLICATIONS

European Search Report and Written Opinion in related EP Application 25204947.3 mailed Mar. 24, 2026, 7 pages.

* cited by examiner

*Primary Examiner* — Hai H Huynh
(74) *Attorney, Agent, or Firm* — Hovey Williams LLP

(57) ABSTRACT

An aircraft system and method for mitigating erroneous flight control commands on an aircraft. The aircraft system includes Vehicle Management Computer (VMC), at least one Flight Control Computer (FCC), and a Power Distribution Unit (PDU) electrically coupled to both the VMC and the FCC. The VMC controls power flow to electric loads unrelated to flight control, while the FCC controls electric propulsion units, flight actuators, and other flight critical components. The FCC places the PDU in a locked state by sending a lock signal to the PDU based on the FCC receiving an indication that the aircraft is in flight or that one of the flight critical components have failed. In the locked state, the PDU suspends any state changes of the PDU until receiving an unlock signal from the FCC or no longer receiving the lock signal from the FCC.

20 Claims, 4 Drawing Sheets

SYSTEM AND METHOD FOR SAFEGUARDING VEHICLE POWER DISTRIBUTION FROM ERRONEOUS COMMANDS

BACKGROUND OF THE INVENTION

In fly-by-wire aircraft, Flight Control Computers (FCCs) manage flight operations. Failures in these systems can lead to catastrophic events. To mitigate such risks, FCCs are designed with significant complexity, increasing both their cost and the certification workload. Some aircraft systems use redundancies such as multiple FCCs that are dissimilar to each other and counter-check each other to confirm that everything is working correctly in order to avoid catastrophic failures.

Traditionally power distribution systems have not been as complex as the FCCs. However, modern electric vehicles have more active components in their power distribution systems compared to traditional aircraft, and failures in these components can also result in catastrophic events. Catastrophic failures in the Power Distribution Unit (PDU) can lead to the whole vehicle turning off in flight. Although redundancies can be used for the PDU, this adds undesirable weight, complexity, and cost to the aircraft.

Thus, there is a need for a method to mitigate these failures without adding complexity or cost.

SUMMARY OF THE INVENTION

Embodiments of the current invention address one or more of the above-mentioned problems and provide a distinct advance in the art of power distribution units for aircrafts, particularly flight-by-wire aircrafts. In one embodiment, an aircraft system of an aircraft includes a Vehicle Management Computer (VMC) for controlling power flow to electric loads unrelated to flight control, at least one Flight Control Computer (FCC) for controlling one or more flight critical components, and a Power Distribution Unit (PDU) electrically coupled to the VMC and the FCC. The FCC is configured to place the PDU in a locked configuration by sending a lock signal to the PDU based on the FCC receiving an indication that the aircraft is in flight or that one or more flight critical components have failed, wherein in the locked configuration the PDU is configured to suspend any state changes of the PDU until receiving from the FCC an unlock signal or until the PDU stops receiving the lock signal.

In other embodiments, a method for mitigating erroneous flight control commands on an aircraft includes the steps of receiving with a Flight Control Computer (FCC) a first indication that the aircraft is in flight or that one or more critical flight components have failed, and in response to receiving the first indication, sending from the FCC a lock signal to a power distribution unit (PDU) of the aircraft instructing the PDU to be placed in a locked configuration in which any further switching of the relays or contactors of the PDU is disallowed. The method may further include the steps of receiving with the FCC a second indication that the aircraft is no longer in flight or that the one or more critical flight components of the aircraft that had failed are now functional again, and in response to receiving the second indication, sending from the FCC an unlock signal to the PDU of the aircraft instructing the PDU to be placed in an unlocked configuration in which the PDU again allows switching of the relays or contactors.

In yet another embodiment, an aircraft system of an aircraft includes a Vehicle Management Computer (VMC) for controlling power flow to electric loads unrelated to flight control, one or more electric propulsion units or flight actuators, at least one Flight Control Computer (FCC) for controlling the one or more electric propulsion units or flight actuators, and a Power Distribution Unit (PDU). The PDU is electrically coupled to the one or more electric propulsion units or flight actuators, the VMC, and the FCC. The FCC places the PDU in a locked configuration by sending a lock discrete bit to the PDU based on the FCC receiving an indication that the aircraft is in flight or that at least one of the electric propulsion units or at least one of the one or more flight actuators have failed. In the locked configuration, the PDU suspends any state changes of the PDU until the FCC sends an unlock discrete bit.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
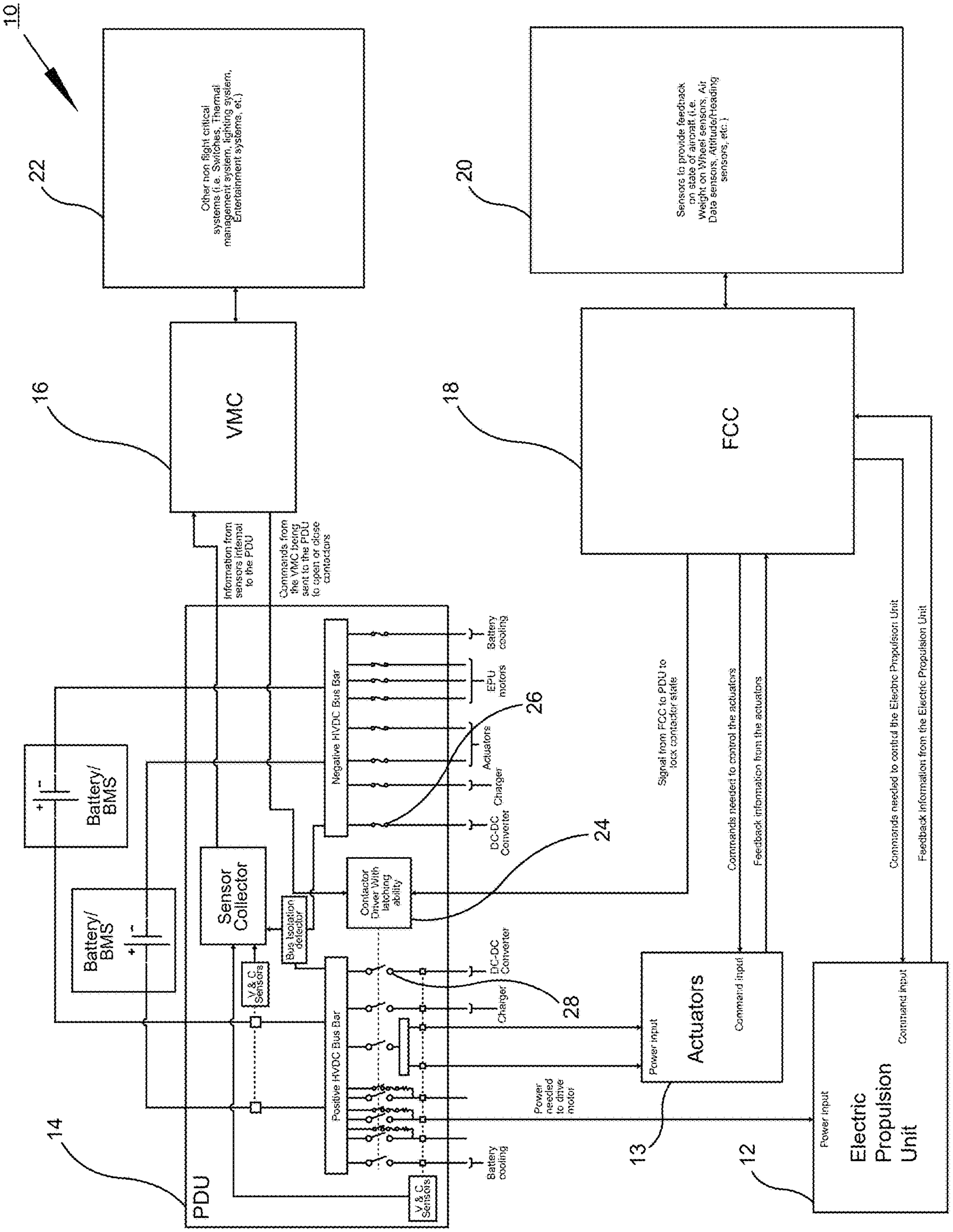
FIG. 1 is a schematic block diagram depicted various components of a system for mitigating erroneous flight control commands, in accordance with various embodiments herein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

The present invention can be used for various aircrafts, such as the NEXUS manufactured by Textron eAviation Inc. headquartered in Wichita, Kansas. The NEXUS, for example, is a multi-mission aircraft designed to provide sustainable aviation solutions. The NEXUS is a zero-emission aircraft, typically configured for one pilot and four passengers, and is powered by a distributed electric propulsion system. The systems described herein can be incorporated into the NEXUS and other fly-by-wire aircrafts with a high voltage battery power distribution system, for example.

In one or more embodiments described and depicted herein, the aircraft may use a Vehicle Management Computer (VMC) to control power flow to all high-voltage electrical loads through a Power Distribution Unit (PDU). An erroneous command from the VMC during certain phases of operation could lead to a catastrophic failure. To mitigate this risk, a Flight Control Computer (FCC) or multiple FCCs (e.g., when multiple FCCs are present for redundancy purposes) use sensors to detect when the aircraft is in a critical phase of operation. During these phases, the FCC sends a signal to the PDU to lock its current state. This locking ensures that if the VMC sends an erroneous command, the PDU state remains unchanged, preventing any potential failure. Although the VMC is still the primary PDU controller and can host logic and programming regarding when to turn certain things on and off and when to power certain things up in the aircraft's non-flight-critical systems, the FCC is given the ability to interrupt that communication or lock the PDU in a certain state during flight to prevent catastrophic failures.

Specifically, in one or more example embodiments, as depicted in FIG. 1, a system 10 for mitigating the risk of erroneous flight control commands includes: an electric propulsion unit 12, actuators 13, a PDU 14, a VMC 16, and an FCC 18. In some embodiments, the system 10 also include one or more sensors 20 configured to provide feedback on the state of the aircraft to the FCC 18 and/or various non flight critical systems 22, such as switches, a thermal management system, a lighting system, an entertainment system, or the like, controlled by the VMC 16.

The electric propulsion unit 12 may be an electric motor or the like. The electric propulsion unit 12 can comprise one or more electric propulsion units configured to use electrical power to generate thrust, propelling the aircraft forward and/or upwards. For example, the electrical propulsion units may include four propulsion units configured to propel the aircraft both forwards and upwards and two propulsion units configured to only provide lift for the aircraft. However, any number and type of electric propulsion units may be used without departing from the scope of the technology described herein. The electric propulsion unit 12 may receive control signals from the FCC 18 and may be connected to power via the PDU 14.

In some embodiments, the actuators 13 are configured to actuate various mechanically actuatable flight control surfaces or components of the aircraft. For example, in a fly-by-wire aircraft, the actuators 13 can be configured for actuating aircraft control surfaces (e.g., ailerons, elevators, rudder) in response to pilot inputs or autopilot commands. The actuators 13 may be configured to translate electrical signals into mechanical motion. Note that although only one actuator is depicted in FIG. 1, numerous actuators can be included in the system 10 and each can be connected to a different one of contactors, fuses, or relays of the PDU 14, as later described herein.

In some embodiments, at least some of the electric propulsion unit 12 and the actuators 13 described herein may specifically comprise "flight critical components". Furthermore, a battery of the aircraft may be considered to be one of the flight critical components. The term "flight critical components" as defined herein refers to any electrically-controlled components of the aircraft that are electrically coupled to the PDU and are identified as components whose failure reduces the capability of the aircraft in an undesired way or by an undesired amount. In some embodiments, certain aircraft components relevant to the flight of the aircraft are designed with backups (such as including three FCCs, three attitude and heading reference systems, and the like). In those situations, a loss of one flight critical component does not lead to reduced capability, but failure of the system of all three FCCs, for example, would be considered flight critical. Thus, some components described herein may be considered flight critical if only one of them goes out, while others may be considered flight critical components by the FCC only if a particular plurality or combination of them fail.

In one or more embodiments, the PDU 14 can comprise a box containing a bus bar, contactors 28, and various internal sensors. In some embodiments, the PDU 14 can additionally or alternatively comprise one or more processing elements or other such computer components described herein. The main purpose of the PDU 14 is to distribute power from batteries to electrical load spread throughout the aircraft. For example, as depicted in FIG. 1, the PDU 14 can comprise a contactor driver (e.g., a latch chip 24 such as a contactor driver with latching ability), a positive high voltage direct current (HVDC) bus bar, a negative HVDC bus bar, an actuator bus, voltage and current (V & C) sensors (also known as electronic instrument transformers or EITs), a sensor collector, and/or a bus isolation detector between the positive and negative HVDC bus bars. The latch chip 24 can be a circuit configured and/or programmed (e.g., via hardware and/or software) to provide instructions from the VMC 16 in an unlocked configuration and suspend sending any instructions from the VMC 16 when receiving a lock signal from the FCC 18 to place the PDU 14 in a locked configuration.

Additionally, the PDU 14 may comprise a plurality of resistors, fuses 26, the contactors 28, relays, or other circuitry known in the art of power distribution units or circuitry. The PDU 14 may also comprise and/or be electrically connectable to one or more power sources or batteries. The batteries may have battery management systems (BMSs) associated therewith and configured to manage and monitor at least one of the batteries, ensuring safe and efficient operation. The PDU 14 is configured to receives high voltage power and then distribute that out to multiple high voltage loads. In some embodiments, the VMC 16 is connected to the PDU 14 via a digital data bus or the contactor driver with latching ability (e.g., the latch chip 24) depicted in FIG. 1. If one or more of the relays or contactors 28 opens inadvertently or at an undesirable time, part or all of the aircraft can lose power.

In general, the VMC 16 is configured to command the relays or contactors 28 in the PDU 14 to open and close and route power out to the aircraft. The VMC 16 is configured to monitor, control, and manage vehicle systems (e.g., a battery system, thermal management system, lights, power distribution system, power enable switches, and/or the like). The VMC 16 may comprise processing elements, memory, sensors, communication components, various circuitry elements, and the like. In a fly-by-wire aircraft, the VMC 16 may be configured to control non-flight critical systems as well as the PDU 14 (while the PDU 14 is in the unlocked configuration). The non-flight critical systems may include: a thermal management system, air conditioning, lights, and/or any other systems that do not affect flight controls of the aircraft but still need some type of computer to control them.

The FCC 18 comprises one or more computers (e.g., processing elements, memory, and the like) configured and/or programmed to control flight characteristics of an aircraft, such as via controlling the electric propulsion unit 12, various flight control equipment like the actuators 13 for controlling flight-control surfaces of the aircraft, and various sensors of the aircraft. Specifically, the FCC 18 can be communicably and/or electrically connected to the various flight control equipment (e.g., electric propulsion units, electric motors, actuators for flight control surfaces, and/or the like) and one or more sensors 20. For example, the sensors 20 may include air data computers, radio altimeters, altimeters, attitude and heading reference systems, weight-on-wheel sensors, and/or the like. In one or more embodiments, the FCC 18 has its own sensors and/or corresponding circuitry that can determine what the state of the aircraft is and the state of other systems, propulsion units, motors, and actuators therein. For example, the FCC 18 can be configured to determine when one or more of the electric propulsion units 12 has failed or one or more of the actuators 13 or any one or more flight critical components have failed. In one exemplary embodiment, the sensors 20 include wheel sensors that are communicably coupled to the FCC 18 such that the FCC 18 can use feedback from the wheel sensors to determine that the aircraft is in flight. For example, as weight lifts off wheels or tires of the aircraft, the FCC 18 receives and/or interprets this information from the wheel sensors and in response provides the lock signal (e.g., a lock discrete bit) to the PDU 14 to place the PDU 14 in the locked configuration.

As depicted in FIG. 1, input from both the VMC 16 and the FCC 18 are received by the PDU 14, which is also electrically and/or communicably coupled to the contactors 28 or relays internal to the PDU 14. The FCC 18 is configured to lock the state of the contactors 28 via the latch chip 24 while the FCC 18 is sending the lock signal (e.g., the lock discrete bit) to the latch chip 24. The programming in the FCC 18 can also be configured to set the conditions for when the lock signal (e.g., the lock discrete bit) is set. In the lock configuration, the PDU 14 or the latch chip 24 thereof ignores or otherwise blocks receipt of signals received from the VMC 16.

In use, when turning on the vehicle, the VMC 16 can monitor switches that the pilot uses to activate systems on the aircraft and can activate corresponding systems. During this vehicle activation sequence, the VMC 16 also sends commands to the PDU 14 to open and close the contactors 28, determining which devices receive power. For example, to initiate flight operations, the VMC 16 can close the contactors 28 to the electric propulsion units and/or various flight actuators, enabling them to operate.

While in flight, the FCC 18 monitors the sensors 20 or any aircraft systems communicably coupled thereto in order to determine a phase of flight of the aircraft. During certain phases, the FCC 18 can be configured to send the lock signal directly to the PDU 14 to lock the contactor states. While this lock signal is active, the VMC 16 can be prohibited from changing the contactor state of the PDU 14. In some embodiments, it can be critical that certain ones of those contactors 28 do not open during flight, thus inadvertently causing certain flight-critical actuators or electric propulsion units to turn off. Once the aircraft exits this phase (e.g., lands), the FCC 18 is configured to remove the lock signal (and/or provide an unlock signal), and the VMC 16 automatically regains control over the PDU 14. That is, in this unlocked configuration, the VMC 16 can send signals to change various ones of the contactors 28 and/or relays of the PDU 14.

Additionally or alternatively, the FCC 18 or a plurality of the FCCs can monitor the sensors 20 and/or systems that indicate when one or more flight-critical components or systems fail, at which point the FCC 18 can send the lock signal directly to the PDU 14 to lock the contractors states. Other triggers for sending the lock signal to the PDU 14 may be used without departing from the scope of the technology disclosed herein. For example, the triggers for the locked configuration may correspond to any states of the aircraft that may result in erroneous commands being received from the VMC 16 by the PDU 14. Erroneous commands can occur when the VMC 16 sends a signal that was not intended or was corrupted mid-transit, for example. However, other conditions can lead to erroneous commands from the VMC 16 without departing from the scope of the technology described herein.

Figure 2:
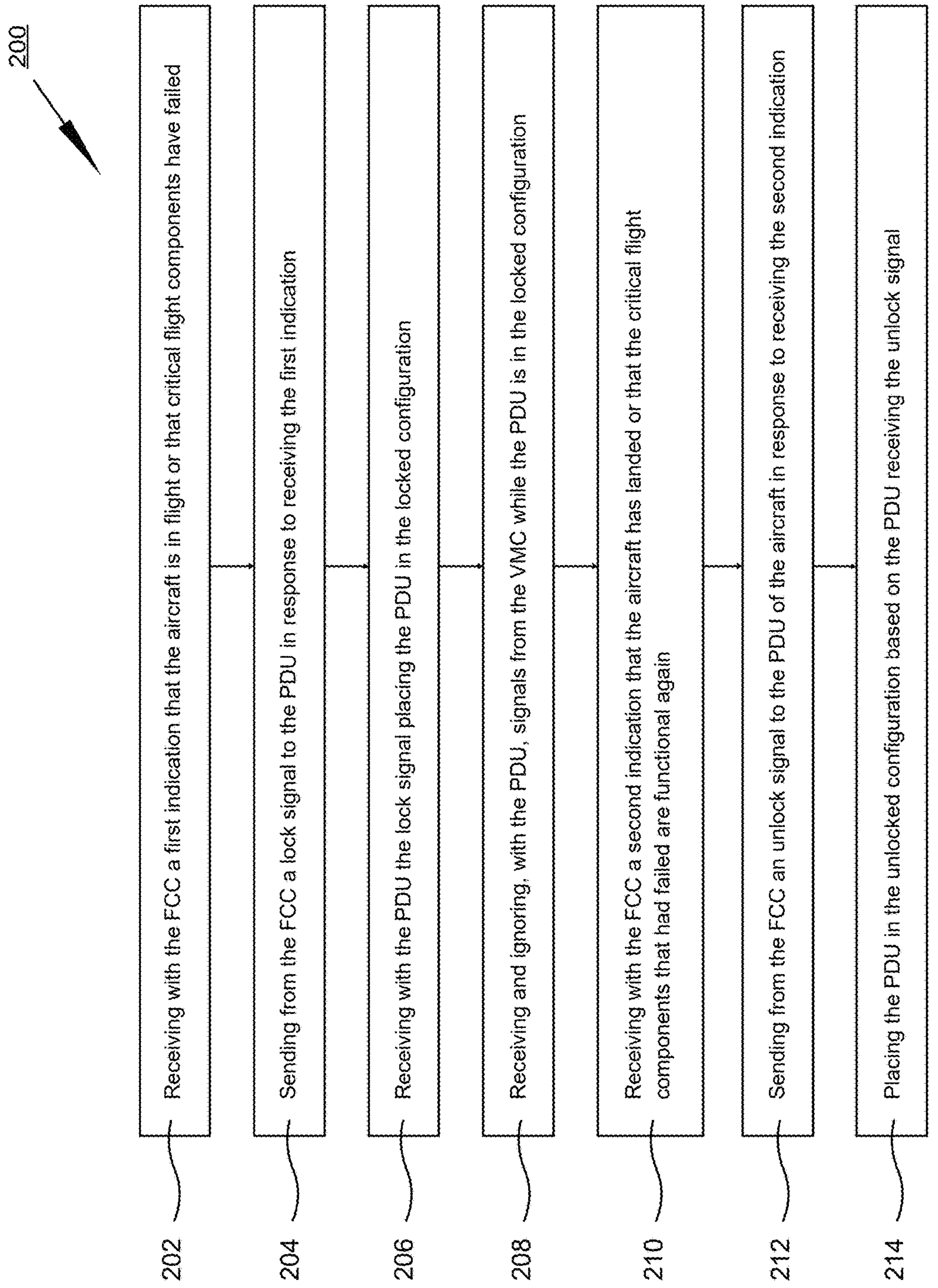
FIG. 2 is a flow chart of an exemplary method for mitigating erroneous flight control commands on an aircraft.

The flow chart of FIG. 2 depicts an exemplary method 200 for mitigating erroneous flight control commands on an aircraft in more detail. In some embodiments, various steps may be omitted, or steps may occur out of the order depicted in FIG. 2 without departing from the scope of the technology as described herein. For example, two blocks shown in succession in FIG. 2 may in fact be executed substantially concurrently, or blocks may sometimes be executed in the reverse order depending upon the functionality involved.

In one or more embodiments, the method 200 may include a step of receiving with the FCC 18 a first indication that the aircraft is in flight or that one or more critical flight components have failed, as depicted in block 202, as well as a step, in response to receiving the first indication, of sending from the FCC 18 the lock signal (e.g., discrete bit or the lock discrete bit) to the PDU 14 of the aircraft, as depicted in block 204. In some embodiments, the first indication (e.g., feedback signals) is received from a wheel sensor indicating that the aircraft is in flight (e.g., a wheel weight sensor or the like), and/or the second indication is based on the wheel sensor indicating to the FCC 18 that the aircraft has landed. Additionally or alternatively, the first indication may be received by the FCC 18 from one or more of the sensors 20. For example, the sensors 20 can include at least one of air data computers, radio altimeters, altimeters, attitude and heading reference systems, and one or more critical flight component sensors.

In some embodiments, the method 200 can include a step of receiving with the PDU 14 the lock signal, as depicted in block 206. The lock signal instructs the PDU 14 to be placed in the locked configuration in which any further switching of the relays or contactors 28 of the PDU 14 is disallowed. That is, upon receipt of the lock signal by the latch chip 24, the latch chip 24 causes the PDU 14 to ignore any signals received from the VMC 16 and to keep the contactors 28 or relays in the same configuration these switches were in when the PDU 14 received the lock signal. Furthermore, the method 200 may include a step of the PDU 14 receiving and ignoring signals from the VMC 16 while the PDU 14 is in the locked configuration, as depicted in block 208. That is, the PDU 14 is configured to remain in its current state (e.g., no switching of the contactors 28 or relays from opened to closed or vice versa) when in the locked configuration, regardless of any signals received from the VMC 16. That is, in the locked configuration, the PDU 14 and/or the latch chip 24 thereof suspends any state changes of the PDU 14 until receiving from the FCC 18 the unlock signal or until the PDU 14 stops receiving the lock signal. As described above, the PDU 14 comprises a plurality of relays or the contactors 28 switchable between their open states and their closed states while the PDU 14 is in the unlocked configuration, but the PDU 14 automatically freezes or suspends the open or closed states of each of the plurality of relays or the contactors 28 while in the locked configuration.

In one or more embodiments, the method 200 further includes a step of receiving with the FCC 18 a second indication that the aircraft is no longer in flight or that the one or more critical flight components of the aircraft that had failed are now functional again, as depicted in block 210. For example, the electric propulsion unit 12 or propulsion units in some embodiments may be considered flight critical components, as well as one or more of the flight actuators described herein. In response to receiving the second indication, the method 200 can include a step of sending from the FCC 18 the unlock signal to the PDU 14 of the aircraft, as depicted in block 212, as well as a step of the placing the PDU 14 in the unlocked configuration based on the PDU 14 receiving the unlock signal, as depicted in block 214. That is, the unlock signal instructs the PDU 14 to be placed in the unlocked configuration in which the PDU 14 again allows switching of the relays or contactors 28. Additionally or alternatively, the unlock signal may be omitted and the PDU 14 or the latch chip 24 of the PDU 14 returns to the unlocked configuration once the FCC 18 is no longer applying the lock signal.

Figure 3:
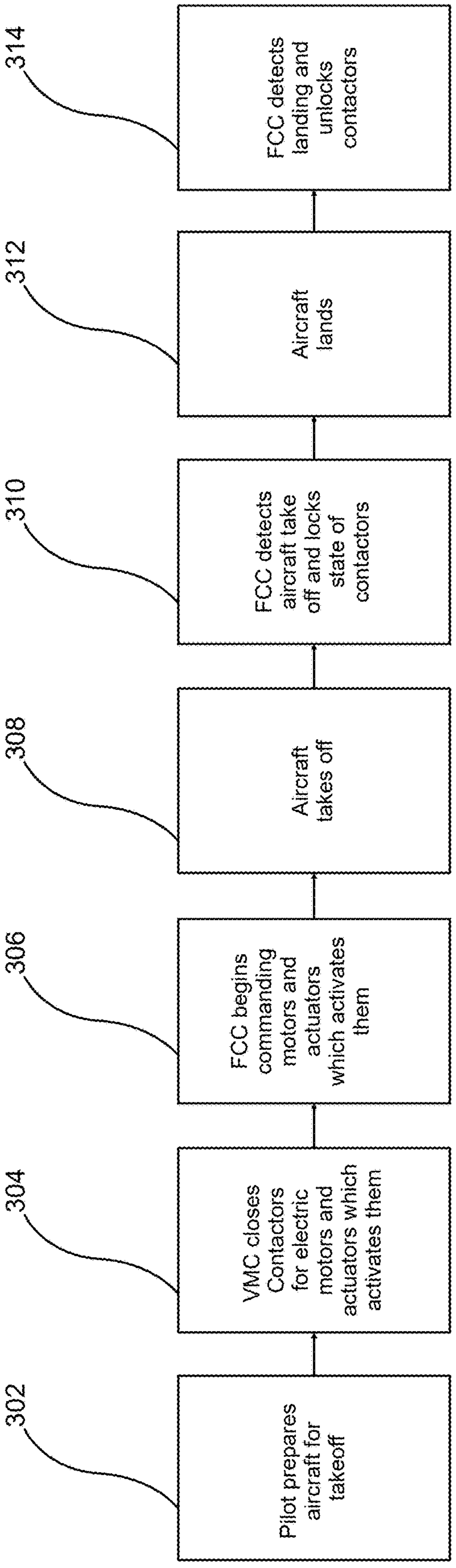
FIG. 3 is a flow chart of an exemplary use case for mitigating erroneous flight control commands on the aircraft using the system of FIG. 1.
Figure 4:
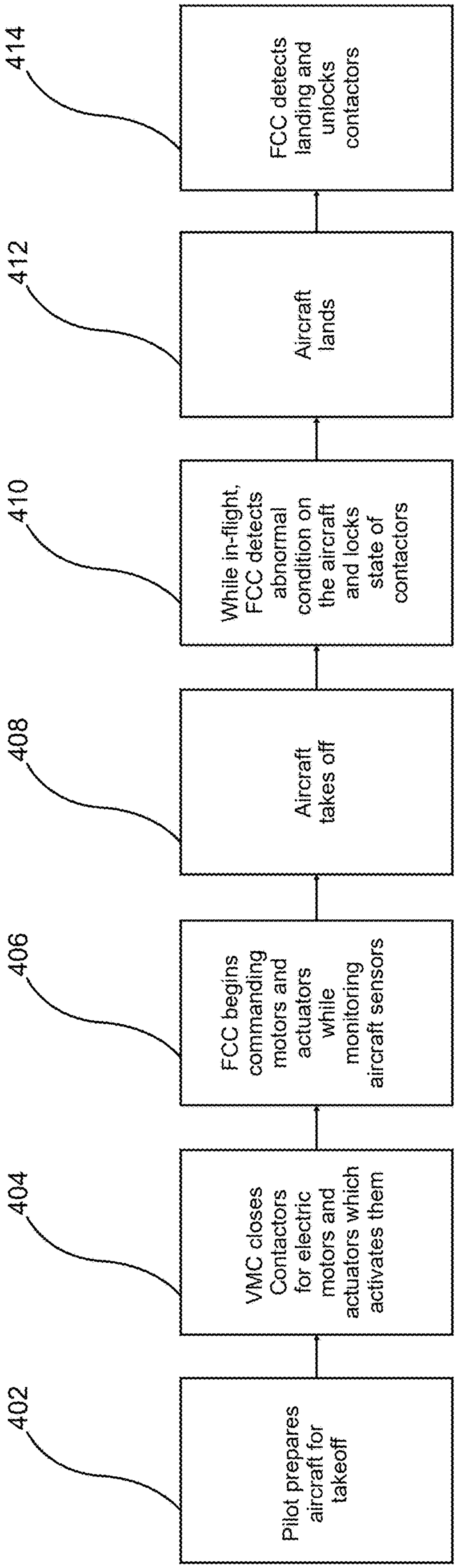
FIG. 4 is a flow chart of another exemplary use case for mitigating erroneous flight control commands on the aircraft using the system of FIG. 1.

Exemplary use cases 300 and 400 depicted in FIGS. 3-4, respectively, depict exemplary steps for operating the system 10 described herein in order to mitigate erroneous flight control commands on an aircraft in more detail. In some embodiments, various steps may be omitted, or steps may occur out of the order depicted in FIG. 3 or 4 without departing from the scope of the technology as described herein. For example, two blocks shown in succession in FIG. 3 or 4 may in fact be executed substantially concurrently, or blocks may sometimes be executed in the reverse order depending upon the functionality involved.

In the example use case 300 depicted in FIG. 3, a pilot prepares the aircraft for takeoff, as depicted in block 302, and the VMC 16 closes the contactors 28 for electric propulsion units and/or various actuators, as depicted in block 304. Furthermore, the FCC 18 begins commanding electric propulsion units, motors, and/or actuators while monitoring the sensors 20, as depicted in block 306, and the aircraft takes off, as depicted in block 308. Additionally, the FCC 18 detects aircraft takeoff (e.g., via the wheel sensor) and locks the state of the contactors 28, as depicted in block 310, thus placing the PDU 14 in the locked configuration. Once the aircraft lands, as depicted in block 312, the FCC 18 detects landing (e.g., via the wheel sensor) and unlocks the contactors 28 of the PDU 14, as depicted in block 314.

In the example use case 400 depicted in FIG. 4, the pilot prepares the aircraft for takeoff, as depicted in block 402, and the VMC 16 closes the contactors 28 for electric propulsion units and/or various actuators, as depicted in block 404. Furthermore, the FCC 18 begins commanding electric propulsion units, motors, and/or actuators while monitoring the sensors 20, as depicted in block 406, and the aircraft takes off, as depicted in block 408. Additionally, while in flight, the FCC 18 detects abnormal conditions (e.g., failure of flight critical components sensed) on the aircraft and locks the state of the contactors 28, as depicted in block 410, thus placing the PDU 14 in the locked configuration. Once the aircraft lands, as depicted in block 412, the FCC 18 detects landing and unlocks the contactors 28 of the PDU 14, as depicted in block 414. Additionally or alternatively, the FCC 18 may detect that the abnormal conditions have returned to normal at some point during flight and may then place the PDU 14 in the unlocked configuration.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. An aircraft system of an aircraft, the aircraft system comprising:
- a Vehicle Management Computer (VMC) configured to control power flow to electric loads unrelated to flight control;
- at least one Flight Control Computer (FCC) configured to control one or more flight critical components; and
- a Power Distribution Unit (PDU) electrically coupled to the VMC and the FCC, wherein the FCC is configured to place the PDU in a locked configuration by sending a lock signal to the PDU based on the FCC receiving an indication that the aircraft is in flight or that one or more flight critical components have failed, wherein in the locked configuration the PDU is configured to suspend any state changes of the PDU until receiving from the FCC an unlock signal or until the PDU stops receiving the lock signal.

2. The aircraft system of claim 1, wherein the PDU is configured to remain in its current state when in the locked configuration regardless of any signals received from the VMC while the PDU is in the locked configuration.

3. The aircraft system of claim 1, wherein the PDU further comprises a plurality of relays or contactors switchable between an open state and a closed state, wherein the PDU is configured to freeze the open or closed states of each of the plurality of relays or contactors in the locked configuration.

4. The aircraft system of claim 1, wherein the PDU comprises a latch chip configured to place the PDU into the locked configuration and out of the locked configuration based on signals received from the FCC.

5. The aircraft system of claim 1, further comprising a wheel sensor, wherein the FCC is configured or programmed to send the lock signal based on receipt of indication from the wheel sensor that the aircraft is in flight.

6. The aircraft system of claim 5, wherein the FCC is configured to send the unlock signal or stop sending the lock signal based on the wheel sensor indicating to the FCC that the aircraft has landed.

7. The aircraft system of claim 1, further comprising one or more sensors, wherein the one or more sensors include at least one of air data computers, radio altimeters, altimeters, attitude and heading reference systems, and weight-on-wheel sensors, wherein the FCC is configured or programmed to send the lock signal based on receipt of indication that at least one of the one or more sensors indicates a failure of one or more critical flight components.

8. The aircraft system of claim 1, wherein the flight critical components comprise one or more flight actuators and one or more electric propulsion units electrically coupled to the PDU.

9. The aircraft system of claim 1, wherein at least one of the lock signal and the unlock signal comprise at least one discrete bit output by the FCC.

10. A method for mitigating erroneous flight control commands on an aircraft, the method comprising:

receiving with a Flight Control Computer (FCC) a first indication that the aircraft is in flight or that one or more critical flight components have failed;

in response to receiving the first indication, sending from the FCC a lock signal to a power distribution unit (PDU) of the aircraft instructing the PDU to be placed in a locked configuration in which any further switching of the relays or contactors of the PDU is disallowed;

receiving with the FCC a second indication that the aircraft is no longer in flight or that the one or more critical flight components of the aircraft that had failed are now functional again; and in response to receiving the second indication, sending from the FCC an unlock signal to the PDU of the aircraft instructing the PDU to be placed in an unlocked configuration in which the PDU again allows switching of the relays or contactors.

11. The method of claim 10, further comprising:

receiving with the PDU the lock signal; and the PDU receiving signals from a Vehicle Management Computer (VMC) while the PDU is in the locked configuration, wherein the PDU is configured to remain in its current state when in the locked configuration regardless of any signals received from the VMC.

12. The method of claim 11, wherein the PDU comprises a plurality of relays or contactors switchable between an open state and a closed state while the PDU is in the unlocked configuration, wherein the PDU automatically freezes the open or closed states of each of the plurality of relays or contactors in the locked configuration.

13. The method of claim 11, wherein a latch chip of the PDU receives the lock signal and places the PDU into the locked configuration automatically in response to receiving the lock signal from the FCC.

14. The method of claim 10, wherein receiving with the FCC the first indication further comprises receiving the first indication from a wheel sensor that the aircraft is in flight.

15. The method of claim 14, where the second indication is based on the wheel sensor indicating to the FCC that the aircraft has landed.

16. The method of claim 10, wherein receiving from the FCC the first indication further comprises receiving the first indication from one or more sensors, wherein the one or more sensors include at least one of air data computers, radio altimeters, altimeters, attitude and heading reference systems, and one or more critical flight component sensors.

17. The method of claim 10, wherein one or more flight actuators of the aircraft are electrically coupled to the PDU.

18. An aircraft system of an aircraft, the aircraft system comprising:

a Vehicle Management Computer (VMC) configured to control power flow to electric loads unrelated to flight control;

one or more electric propulsion units;

one or more flight actuators;

at least one Flight Control Computer (FCC) configured to control the one or more electric propulsion units and the one or more flight actuators;

a Power Distribution Unit (PDU) electrically coupled to the one or more electric propulsion units, the one or more flight actuators, the VMC, and the FCC, wherein the FCC is configured to place the PDU in a locked configuration by sending a lock discrete bit to the PDU based on the FCC receiving an indication that the aircraft is in flight, or based on the FCC receiving an indication that at least one of the one or more of electric propulsion units or at least one of the one or more flight actuators have failed, wherein in the locked configuration the PDU is configured to suspend any state changes of the PDU until the FCC sends an unlock discrete bit.

19. The aircraft system of claim 18, wherein the one or more flight actuators and the one or more electric propulsion units are flight critical components.

20. The aircraft system of claim 18, wherein the PDU further comprises a latch chip and a plurality of relays or contactors switchable between an open state and a closed state, wherein the latch chip is configured to freeze the open or closed states of each of the plurality of relays or contactors in the locked configuration upon receipt of the lock discrete bit.

* * * * *